(12) United States Patent
Breslin

(10) Patent No.: US 8,029,608 B1
(45) Date of Patent: Oct. 4, 2011

(54) FURNACE FILTER INDICATOR

(75) Inventor: Stewart Breslin, Pacifica, CA (US)

(73) Assignee: BD Technology Partners, Mountain View, CA (US)

(*) Notice: Subject to any disclaimer, the term of this patent is extended or adjusted under 35 U.S.C. 154(b) by 791 days.

(21) Appl. No.: 11/638,993

(22) Filed: Dec. 13, 2006

(51) Int. Cl.
*B01D 49/00* (2006.01)

(52) U.S. Cl. .......... 96/421; 95/19; 96/417; 116/212; 340/611; 340/626

(58) Field of Classification Search ........ 95/19; 96/417, 96/421; 116/212; 340/611, 626
See application file for complete search history.

(56) References Cited

U.S. PATENT DOCUMENTS

| | | | | |
|---|---|---|---|---|
| 2,753,831 A | | 7/1956 | Davies | 116/112 |
| 2,804,839 A | | 11/1957 | Hallinan | 116/112 |
| 3,936,284 A | * | 2/1976 | Mason | 96/117.5 |
| 4,321,070 A | | 3/1982 | Bede | 55/274 |
| 4,538,136 A | * | 8/1985 | Drabing | 375/306 |
| 4,606,229 A | * | 8/1986 | Spence | 73/722 |
| 4,772,870 A | * | 9/1988 | Reyes | 725/79 |
| 4,820,319 A | * | 4/1989 | Griffis | 96/403 |
| 5,036,698 A | * | 8/1991 | Conti | 73/38 |
| 5,124,957 A | | 6/1992 | Owens et al. | 368/107 |
| 5,294,407 A | * | 3/1994 | Succi et al. | 422/119 |
| 5,386,461 A | * | 1/1995 | Gedney | 379/102.05 |
| 5,461,368 A | * | 10/1995 | Comer | 340/607 |
| 5,711,785 A | * | 1/1998 | Maxwell | 95/15 |
| 5,774,056 A | | 6/1998 | Berry, III et al. | 340/607 |
| 6,096,224 A | * | 8/2000 | Champie | 210/741 |
| 6,110,260 A | | 8/2000 | Kubokawa | 96/26 |
| 6,535,838 B2 | | 3/2003 | Abraham et al. | 702/183 |
| 6,837,922 B2 | | 1/2005 | Gorin | 96/419 |
| 7,244,294 B2 | * | 7/2007 | Kates | 96/417 |
| 2003/0168389 A1 | * | 9/2003 | Astle et al. | 210/85 |
| 2006/0102731 A1 | * | 5/2006 | Mueller et al. | 236/51 |
| 2007/0277592 A1 | * | 12/2007 | Johansson et al. | 73/38 |

OTHER PUBLICATIONS

Craford "LEDs Challenge the Incandescents" IEEE Circuits and Devices Magazine, vol. 8, p. 24 Sep. 1992.*
www.oxyfilters.com/oxy-filtergage.html.
www.bryant.com.
www.espenergy.com/lux_lighted_programmable_thermostat.htm.

* cited by examiner

*Primary Examiner* — Jason M Greene
*Assistant Examiner* — Anthony Shumate
(74) *Attorney, Agent, or Firm* — Haverstock & Owens LLP

(57) ABSTRACT

A furnace filter indicator system comprises a pressure differential switch that monitors air pressure near a furnace filter, and a transmitter coupled to the pressure differential switch sends a signal to a receiver within a thermostat. The receiver includes an indicator for indicating the status of the furnace filter. If the pressure differential near the furnace filter triggers the switch, then the indicator will receive a "dirty" signal and will indicate that the furnace filter is dirty and should be replaced. The furnace filter indicator system is able to be installed on a previously installed furnace/thermostat system by utilizing the pre-existing wiring.

39 Claims, 5 Drawing Sheets

FURNACE FILTER INDICATOR

FIELD OF THE INVENTION

The present invention relates to the field of furnace filter diagnostics. More specifically, the present invention relates to the field of remote furnace filter indicators using pre-existing thermostat wiring.

BACKGROUND OF THE INVENTION

Systems for delivering heated air include filtration equipment for removing particles from the air. The systems typically include mechanical filters formed from fibrous materials. The filter material functions to block particulate matter that is in the air. Particulate matter becomes attached to the filter material which, over a period of time, progressively restricts the flow of air through the filter.

The increased restriction reduces the efficiency of the heat delivery system and the effective heating of the building. The partially clogged filter also causes increased back pressure to be applied to the blower or fan which generates the air flow in forced air systems and this back pressure increases the work that must be performed and the energy consumed by the blower or fan unit. The resulting added load increases the wear rate of the moving parts in the heating system and also results in increased operating costs. Ultimately, a heavily clogged filter can cause the system to stop operating completely, create a fire hazard or fail catastrophically "dumping" the captured particles back into the airstream and into the house. Thus, it is important that partially clogged or dirty air filters are replaced promptly.

In order to determine when an air filter needs to be changed, a person typically must gain access to the filter. The filter is then removed and visually inspected. If through the visual inspection it is determined that there is a significant build up of particulate matter on the outside surface of the air filter, it is replaced with a new filter. This procedure has many problems. This procedure requires the air filter to be periodically checked in order to determine when the filter needs to be changed. This often results in dirty filters not being changed on time because people do not remember to check. Also, the mere visual inspection of the air filter does not always result in an accurate determination if the filter should be replaced. The visual inspection of the surface of the filter is not necessarily reliable in determining the condition of the filter because visible surface contamination or the lack of visible surface contamination may not be representative of contamination plugging flow paths inside the filter material.

In light of these drawbacks, many devices have been developed to determine when an air filter is dirty and needs replacement. The devices attempt to provide an indication of the need for replacement of an air filter in a heating system.

Examples of such devices are set forth in U.S. Pat. Nos. 2,753,831 and 4,321,070 which describe a device with a tube which extends through an air filter and incorporates a whistle. In these devices, air flows continuously through a tube and as the air flow through the tube increases as a result of increasing clogging of the surrounding air filter, the whistle generates a sound when the air flow rate is of a sufficient magnitude. These devices have potential problems since contamination and clogging of the tube may occur and may have a negative effect upon the operation of the whistle. Furthermore, indication by sound is not necessarily a preferable means of alerting people; for instance, with people who have difficulty hearing.

U.S. Pat. No. 2,804,839 to Hallinan discloses a device for providing a visual and audible indication of the clogging of an air filter. The device uses a magnet for retaining a pivotable member in place that provides a visual indicator and actuates a structure capable of sounding an audible alarm.

U.S. Pat. No. 6,837,922 to Gorin discloses an air filter sensor kit that includes an air filter sensor with a portion shaped for insertion through the air filter and a portion with an indicator for indicating the condition of the air filter. The kit includes an air filter sensor member for connecting the air filter sensor to an air filter grill and for supporting the air filter sensor. The kit also includes a cutting tool for cutting a hole in an air filter grill to allow the passage of a portion of the air filter sensor member to permit a portion of the air filter sensor to be inserted through the air filter.

U.S. Pat. No. 6,535,838 to Abraham et al. discloses a furnace diagnostic system and method of communicating controls and historical, as well as real-time diagnostic, information between a residential furnace controller and a portable hand held device carried by a service technician. The system includes sensors that monitor various functions of the furnace. The system provides a method of interrogating the furnace while operating, diagnosing the real time information as well as stored historical data on the furnace operations, controlling furnace components and monitoring the resulting response in real-time, and providing knowledge based troubleshooting assistance to the service technician in an expeditious manner. One embodiment of the method provides infrared communication ports on the furnace controller and handheld device to obviate the need to make physical attachments to the furnace.

U.S. Pat. No. 5,124,957 to Owens et al. discloses a programmable timing device for use in combination with an existing thermostat housing. The apparatus implements an audible and visual display to alert an individual to a need in maintenance of an associated furnace air filter. The apparatus may be secured to a wall surface or optionally, adhesively secured to the existing thermostat housing by means of a mounting bracket. A user sets a timing event with the timing mechanism to notify when the filter needs to be replaced.

SUMMARY OF THE INVENTION

A furnace filter indicator system is described herein. A pressure differential switch monitors air pressure near a furnace filter, and a transmitter coupled to the pressure differential switch sends a signal to a receiver within a thermostat. The receiver includes an indicator for indicating the status of the furnace filter. If the pressure differential near the furnace filter triggers the switch, then the indicator will receive a "dirty" signal and will indicate that the furnace filter is dirty and should be replaced. The furnace filter indicator system described herein is able to be installed on a previously installed furnace/thermostat system by utilizing the pre-existing wiring.

In one aspect, a system for indicating a status of a filter comprises a device for monitoring pressure differential, a transmitter coupled to the device for transmitting a signal related to the pressure differential, a receiver coupled to the transmitter for receiving the signal related to the pressure differential and an indicator coupled to the receiver for indicating status of the filter based on the signal. The transmitter is coupled to a new or preexisting furnace. The transmitter is coupled to pre-existing wires coupling the furnace to the thermostat. Alternatively, the transmitter and the receiver are wirelessly coupled. The device is positioned to detect static air pressure near the filter(s) and a room air pressure. Alternatively, the device is positioned to detect static air pressure on either side of the filter(s). The device is a differential pressure switch. Alternatively, the device is a differential pressure sensor. The indicator includes one or more light emitting diodes. Alternatively, the indicator is a liquid crystal display. The indicator indicates "dirty" after receiving a "dirty" signal from the transmitter. In alternative embodiments, the system further comprises an audible indicator to audibly notify a user to change the filter.

In another aspect, a system for indicating a status of a furnace filter comprises a pressure differential switch positioned near the furnace filter for monitoring pressure differential, a transmitter coupled to the pressure differential switch for transmitting a signal related to the pressure differential, a receiver coupled to the transmitter for receiving the signal related to the pressure differential and one or more light emitting diode indicators coupled to the receiver for indicating status of the furnace filter based on the signal, wherein the transmitter is coupled to pre-existing wires coupling a furnace to a thermostat. The one or more light emitting diode indicators indicate "dirty" after receiving a "dirty" signal from the transmitter. In alternative embodiments, the system further comprises an audible indicator to audibly notify a user to change the filter.

In another aspect, a method of indicating a status of a furnace filter comprises detecting a pressure differential with a device, sending a signal from a transmitter to a receiver wherein the signal corresponds to the pressure differential, receiving the signal from the transmitter at the receiver and indicating status of the furnace filter on an indicator corresponding to the signal from the receiver. The method further comprises installing the device, transmitter, receiver and indicator on a preexisting or new furnace and a new thermostat. Installing further comprises positioning the device and coupling the transmitter to preexisting furnace wiring with the transmitter coupled to the device, wherein the furnace is coupled to the thermostat. Alternatively, the transmitter and the receiver are wirelessly coupled. The device is positioned to detect static air pressure near the furnace filter and a room air pressure. Alternatively, the device is positioned to detect static air pressure on either side of the furnace filter. The device is a differential pressure switch. Alternatively, the device is a differential pressure sensor. The indicator includes one or more light emitting diodes. Alternatively, the indicator is a liquid crystal display. The indicator indicates "dirty" after receiving a "dirty" signal from the transmitter. In alternative embodiments, indicating the status is via an audible signal.

In yet another aspect, a method of installing a furnace filter indicator comprises positioning a device near the furnace filter and coupling the transmitter to preexisting furnace wiring with the transmitter coupled to the device, wherein a furnace is coupled to a thermostat containing a receiver and an indicator. The device is a differential pressure switch. Alternatively, the device is a differential pressure sensor. The indicator includes one or more light emitting diodes. Alternatively, the indicator is a liquid crystal display. The indicator indicates "dirty" after receiving a "dirty" signal from the transmitter.

DETAILED DESCRIPTION OF THE PREFERRED EMBODIMENT

The present invention is a furnace filter status indicator that provides a remote indication when a furnace filter needs to be replaced. The indicator comprises two main components, a differential pressure switch (DPS)/transmitter located at a filter and an indicator/receiver located with a thermostat. The transmitter and receiver communicate through existing thermostat wiring.

Figure 1A:
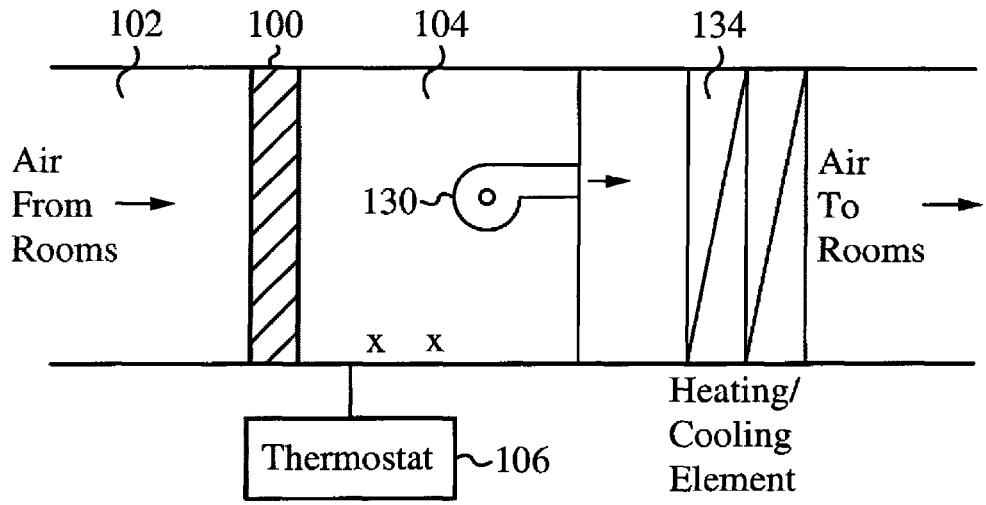
FIG. 1A illustrates a block diagram of a standard installation of a furnace and a thermostat.

FIG. 1A illustrates a block diagram of a standard installation of a furnace 104 and a thermostat 106. In the standard installation, the furnace 104 and thermostat 106 are coupled directly together via wires. A fan 130 is utilized to maintain the flow of the air. A heating/cooling element 134 is utilized to heat or cool the air. The heating/cooling element 134 is able to be positioned as shown or closer to the filter 100 or the fan 130 as designated by x. A filter 100 is used as described above to remove particulates from the air as it comes from a heater return air duct 102.

Figure 1B:
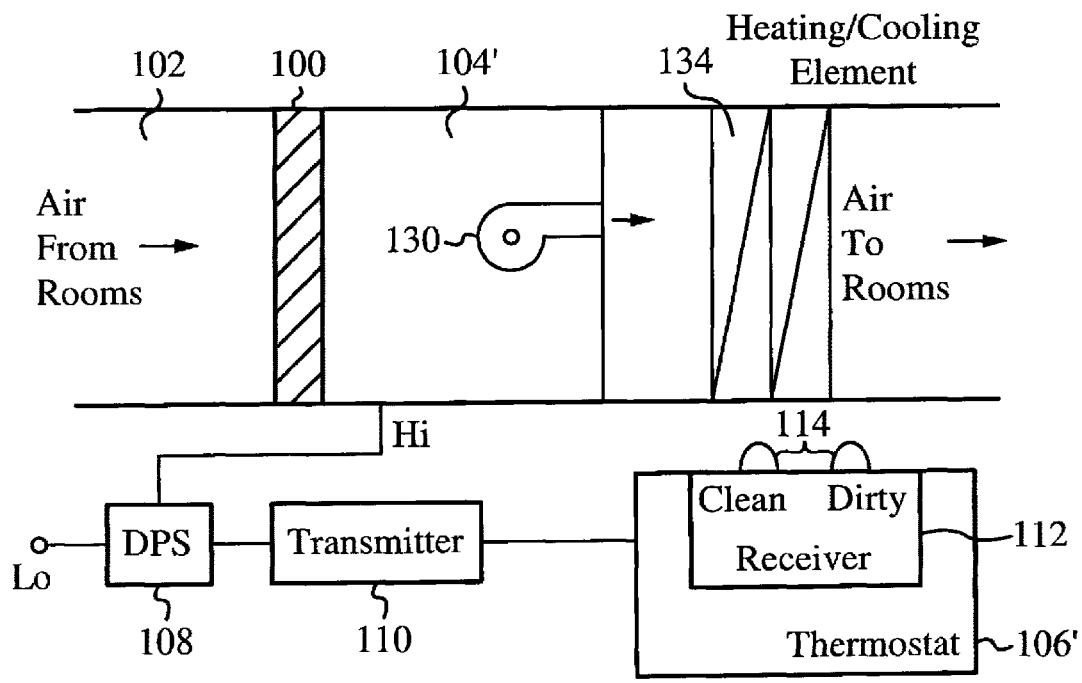
FIG. 1B illustrates a block diagram of a modified installation of a furnace and a thermostat in the preferred embodiment of the present invention.

FIG. 1B illustrates a block diagram of a modified installation of a furnace 104' and a thermostat 106' in the preferred embodiment of the present invention. With the modified installation, the filter 100 still filters out particulates from the air coming through the heater return air duct 102. However, instead of the furnace 104' being simply coupled to the thermostat 106', a DPS 108 and a transmitter 110 are also connected to the thermostat wiring. The DPS 108 is positioned near the filter 100. Specifically, the DPS 108 high side pickup is positioned between the filter 100 and the warm air supply fan 130 so that the change in pressure differential due to filter loading is able to be determined. In the preferred embodiment, the DPS 108 is a mechanical switch. Also, in the preferred embodiment, the DPS low pressure side references room air pressure outside the furnace 104'. Table 1 illustrates the functionality of the DPS 108 such that when the DPS 108 is open the indicator state does not change. However, when the DPS 108 is closed the "replace" or "dirty" indicator is turned on.

TABLE 1

| Differential Pressure Switch | |
|---|---|
| Differential Pressure Switch State | Action |
| Open | Indicator state does not change |
| Closed | Turn "replace" indicator ON |

Figure 2:
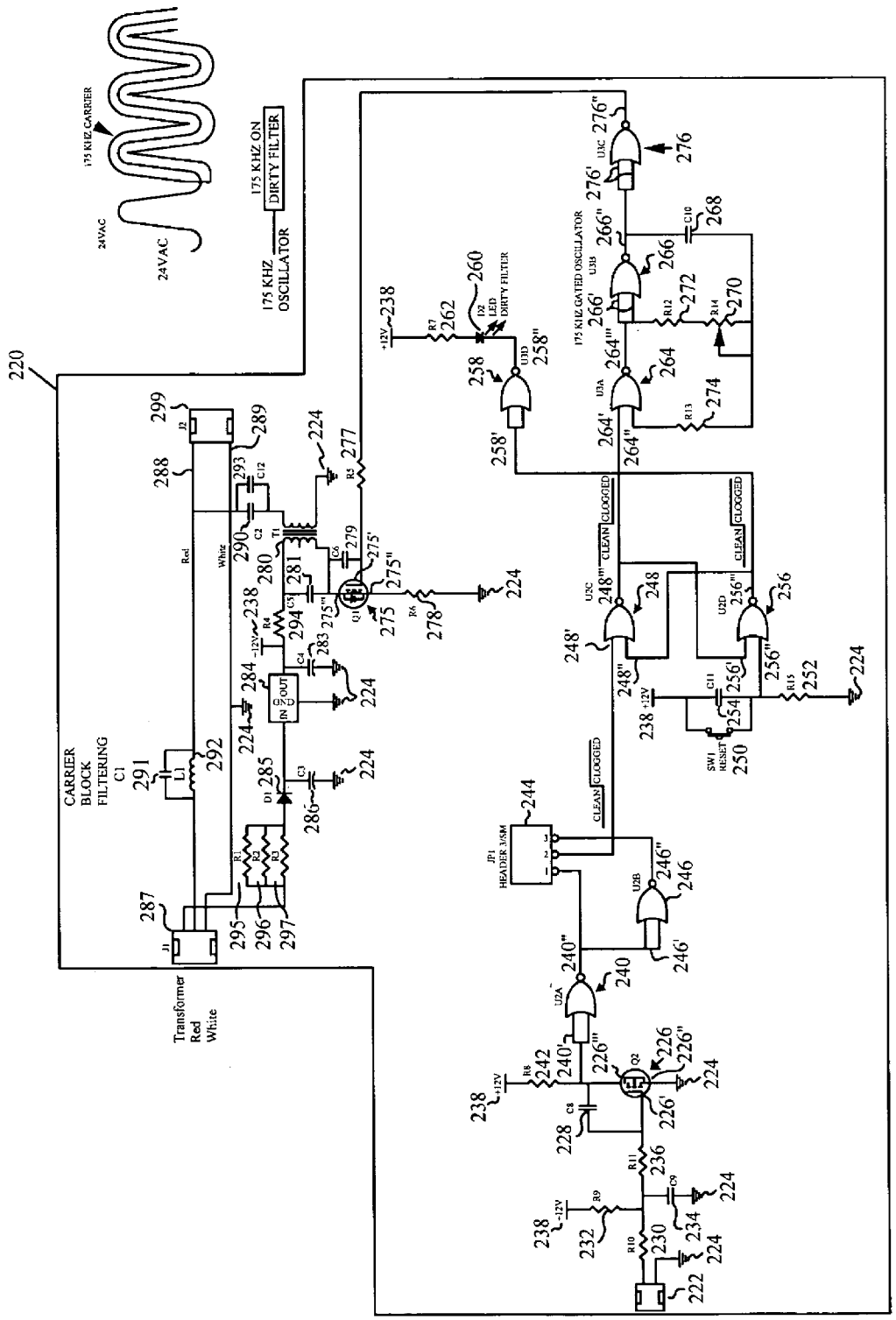
FIG. 2 illustrates an exemplary circuit diagram of a transmitter in the preferred embodiment of the present invention.

The DPS 108 is coupled to the transmitter 110 which transmits the signal determined by the DPS 108. The transmitter 110 is coupled to a receiver 112. In the preferred embodiment, the transmitter 110 is coupled to the receiver 112 via preexisting thermostat wires. The transmitter 110 transmits information from the DPS 108 to the receiver 112 regarding the filter's status. The receiver 112 also includes circuitry (FIG. 3) for receiving the indicator signal from the transmitter 110. A visual indicator 114 is mounted on the thermostat 106' and coupled to the receiver 112 to indicate the state of the filter 100. The indicator 114 indicates both "clean" and "dirty" filter conditions. Additionally, once the "dirty" indicator is triggered, the indicator 114 will continue to show "dirty" until the system is reset using the reset switch SW1 250 (FIG. 2). The indicator and receiver circuitry (FIG. 3) are integrated into the thermostat 106'. To conserve battery life, blinking Light Emitting Diodes (LEDs) 114 are used. Power is provided to the LEDs 114 by a battery 118 (FIG. 5) in the thermostat housing. Alternatively, an audible indicator 132 (FIG. 5) may be used to further ensure a user is notified to change the filter.

FIG. 2 illustrates an exemplary circuit diagram of a transmitter in the preferred embodiment of the present invention. The transmitter components are enclosed in the box 220. Through the transmitter, the pressure switch remains in contact with the thermostat and receiver. A line from a first transmitter connector 222 is coupled to ground 224 while a second line is coupled to the gate 226' of an n-channel Metal Oxide Semiconductor Field Effect Transistor (MOSFET) Q2 226 and a capacitor C8 228 in parallel with a resistor R10 230, a resistor R9 232 to the voltage source Vcc 238, a capacitor C9 234 to ground 224 and a resistor R11 236 in between. The source 226" of the transistor Q2 226 is coupled to ground 224, and the drain 226''' is coupled with the line with the capacitor C8 228 to the inputs 240' of a Nor gate U2A 240 with a resistor R8 242 to the voltage source Vcc 238 in between. The output 240" of the Nor gate U2A 240 splits and is an input to a jumper 244 and the inputs 246' to a Nor gate U2B 246. The output 246" of the Nor gate U1B 246 is also an input to the jumper 244. The output of jumper 244 then is a first input 248' of a Nor gate U2C 248. At this point, a low signal indicates "clean" and a high signal indicates "clogged."

A reset switch SW1 250 with two signal lines is coupled to a line with the voltage source Vcc 238 and ground 224 with a resistor R15 252 between the ground 224 and a capacitor C11 254. The reset switch SW1 250 is coupled to the line between the voltage source Vcc 238 and the resistor R15 252 with the capacitor C11 254 in between. Also coupled to the line between the capacitor C11 254 and the resistor R15 252 is a second input 256" of a Nor gate U2D 256. The output 248''' of the Nor gate U2C 248 is a first input 256' of the Nor gate U2D 256. The output 256''' of the Nor gate U2D 256 is a second input 248" of the Nor gate U2C 248. Thus, the Nor gates U2C 248 and U2D 256 create an S-R flip-flop. At this point the signal output from the Nor gate U2C 248 indicates "clean" when high and "clogged" when low. The signal output from the Nor gate U2D 256 indicates "clean" when low and "clogged" when high. The output 256''' of the Nor gate U2D 256 is also the input 258' of a Nor gate U3D 258. The output 258" of the Nor gate U3D 258 is coupled to a light emitting diode (LED) D2 260 which is coupled to the voltage source Vcc 238 with a resistor R7 262 between the LED D2 260 and the voltage source Vcc 238. When the output 258" of the Nor gate U3D 258 is low, the LED D2 260 is illuminated, indicating a "dirty" filter, and when the output 258" of the Nor gate U3D 258 is high, the LED D2 260 is not illuminated. The output 248''' of the Nor gate U2C 248 is a first input 264' to a Nor gate U3A 264. The output 264''' of the Nor gate U3A 264 is the input 266' of a Nor gate U3B 266. The output 266" of the Nor gate U3B 266 splits and is coupled to a capacitor C10 268 and then splits again with a first line coupling to a second input 264" of the Nor gate U3A 264 after coupling to a resistor R13 274. The second line is coupled to the input 266' of the Nor gate U3B 266 through variable a resistor R14 270 and a resistor R12 272. The line from the output 266" of the Nor gate U3B 266 is also coupled to input lines 276' of a Nor gate U3C 276. The output 276" of the Nor gate U3C 276 couples to the gate 275' of an n-channel MOSFET Q1 275 after coupling through a resistor R6 277.

The source 275" of the transistor Q1 275 is coupled to ground 224 through a resistor R6 278. A capacitor C6 279 couples between the gate 275' of the transistor Q1 275 and the resistor R6 277 to an input of a transformer T1 280. One side of the secondary winding of the transformer T1 280 is grounded at 224. The drain 275''' of the transistor Q1 275 splits with a line coupling to the transformer T1 280. A second line from the drain 275''' is coupled through a capacitor C5 281 and then splits to the transformer 280 and to resistor R4 294 in parallel. Resistor R4 294 is split between one side of capacitor C4 283, +12V 238 and the OUT pin of voltage regulator 284. The regulator GND connection is connected to ground 224. The cathode of diode D1 285 is connected to both the IN side of the voltage regulator 284 and capacitor C3 286 in parallel. The other side of C3 286 is connected to ground at 224. The anode of diode D1 285 is connected to a set of resistors R1 295, R2 296, R3 297 in parallel. The other side of R1, R2 and R3 is connected to the furnace transformer connection at connector J1 287 in parallel. The un-grounded secondary of transformer T1 280 is coupled to a red wire 288 through a pair of capacitors C2 290 and C12 293 to the red wire 288. Capacitors C2 290 and C12 293 are connected in parallel. The white wire 289 at the connector J1 287 is connected to ground at 224. The white wire 289 at the connector J2 299 is connected to ground. The red wire 288 connection from the furnace connector 287 is connected to a carrier blocking filter with capacitor C1 291 and inductor L1 292 in parallel. The other side of this filter is connected to the red wire 288 connection at the thermostat connector 299.

Figure 3:
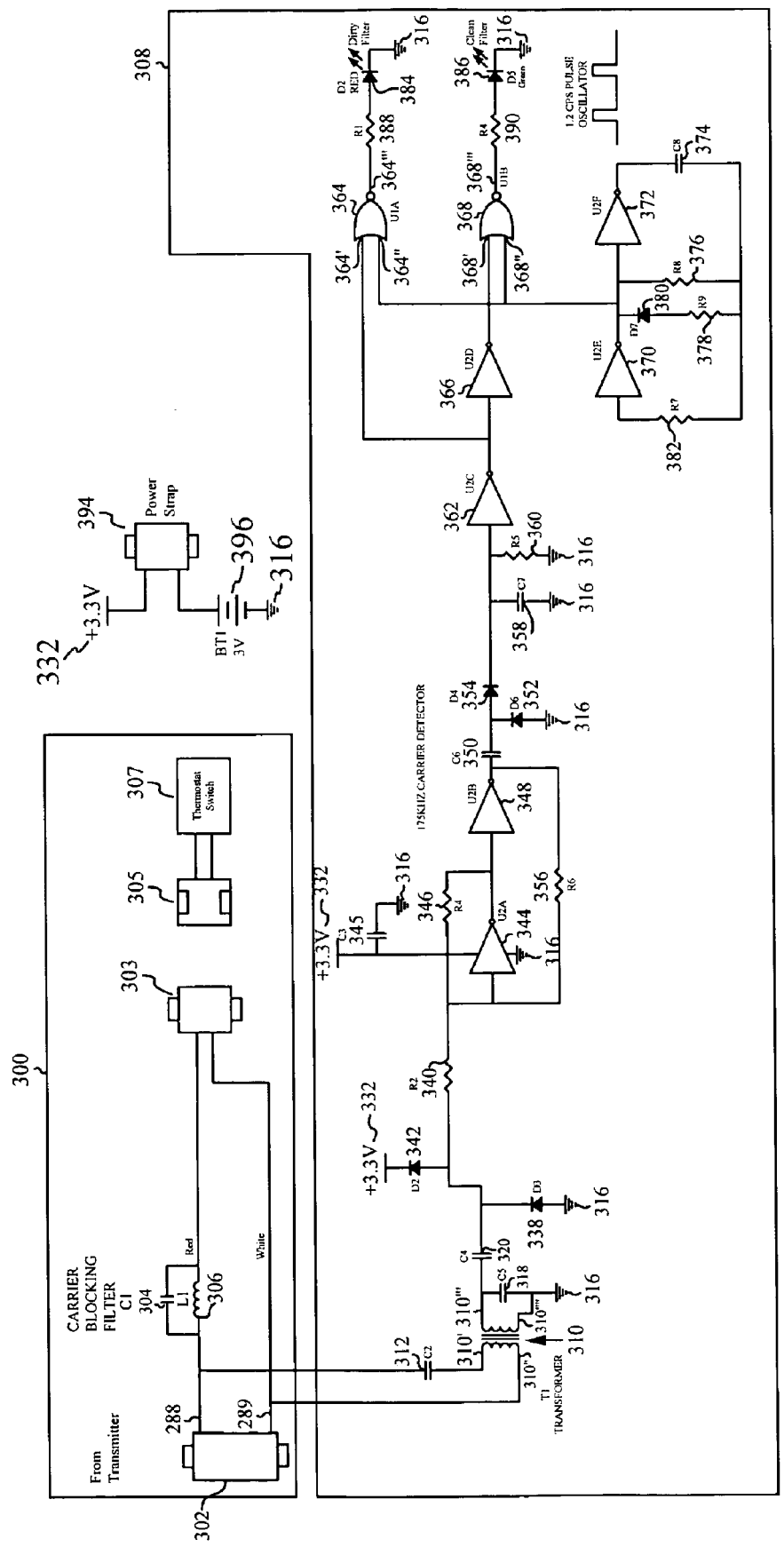
FIG. 3 illustrates an exemplary circuit diagram of a receiver in the preferred embodiment of the present invention.

FIG. 3 illustrates an exemplary circuit diagram of a receiver in the preferred embodiment of the present invention. The components within the box 300 are the components for the thermostat including a connector 302 to the transmitter which connects the red wire 288 and the white wire 289 from the transmitter which are also coupled to a connector 303 which couples to a connector 305 of a thermostat switch 307. A carrier blocking circuit includes a capacitor C1 304 in parallel with an inductor L1 306 on the red wire 288 coupled to the switch 307 through connectors 303 and 305. A 175 kHz tone is inductively coupled onto the thermostat lines.

The components within the box 308 are the components for the receiver. A line extends from the red wire 288 to a first input 310' of the transformer T1 310 through a capacitor C2 312. A line extends from the white wire 289 to a second input 310" of the transformer T1 310 also. A first output 310'''' of the transformer 310 is grounded. The line coupling from the second output 310''' of the transformer T1 310 splits to ground 316 through a capacitor C5 318, then is coupled to a capacitor C4 320, splits again to ground 316 through a diode D3 338 and splits again to Vcc 332 through a diode D2 342. The line continues through resistor R2 340, a split to the input of an inverter U2A 344 and to the line of the output of the inverter U2A 344 with a resistor R4 346 in between, in addition to a split to the output of an inverter U2B 348 through resistor R6 356. The inverter U2A 344 utilizes a capacitor C3 345 coupled between Vcc 332 and ground 316 to store excess energy from the 175 KHz carrier above the voltage level of the battery to extend the batter life of the receiver. The output of the inverter U2A 344 is coupled to the input of the inverter U2B 348. The output of the inverter U2B 348 is coupled to the capacitor C6 350 and then splits to ground 316 with diode D6 352 in between. The line also is coupled to diode D4 354, then splits to ground 316 coupling through capacitor C7 358, splits to ground passing through resistor R5 360 and then reaches the input of an inverter U2C 362. The output of the inverter U2C 362 splits with a line coupling to a first input 364' of a Nor gate U1A 364. The second line is coupled to the input of an inverter U2D 366. The output of the inverter U2D 366 is coupled to the input 368' of a Nor gate U1B 368. Coupled to the second inputs 364" and 368" of the Nor gates U1A 364 and U1B 368 is a line from another section of the circuit.

Within this section of the circuit is an inverter U2E 370 whose output is the line to the second inputs 364" and 368" of the Nor gates U1A 364 and U1B 368. The output of the inverter U2E 370 also is coupled to the input of an inverter U2F 372. The output of the inverter U2F 372 is coupled to a capacitor C8 374, then splits to the input of the inverter U2F 372 through a resistor R8 376, and splits to the output of the inverter U2E 370 through a resistor R9 378 and a diode D7 380, and also splits to a resistor R7 382 coupled to the input of the inverter U2E 370. The output 364' of the Nor gate U1A 364 controls an LED 384 to signal "dirty." The output 368' of the Nor gate U1B 368 controls the LED 386 that signals "clean." The Nor gate U1A 364 is coupled to the LED D1 384 through a resistor R1 388. The Nor gate U1B 368 is coupled to the LED D5 384 through a resistor R4 390. LED D1 386 illuminates red if the filter is dirty, and LED D5 384 illuminates green if the filter is clean.

A power strap is shown also. The power strap includes a connector 394 with a line going to Vcc 332 and a second line going to ground through a battery BT1 396.

Figure 4:
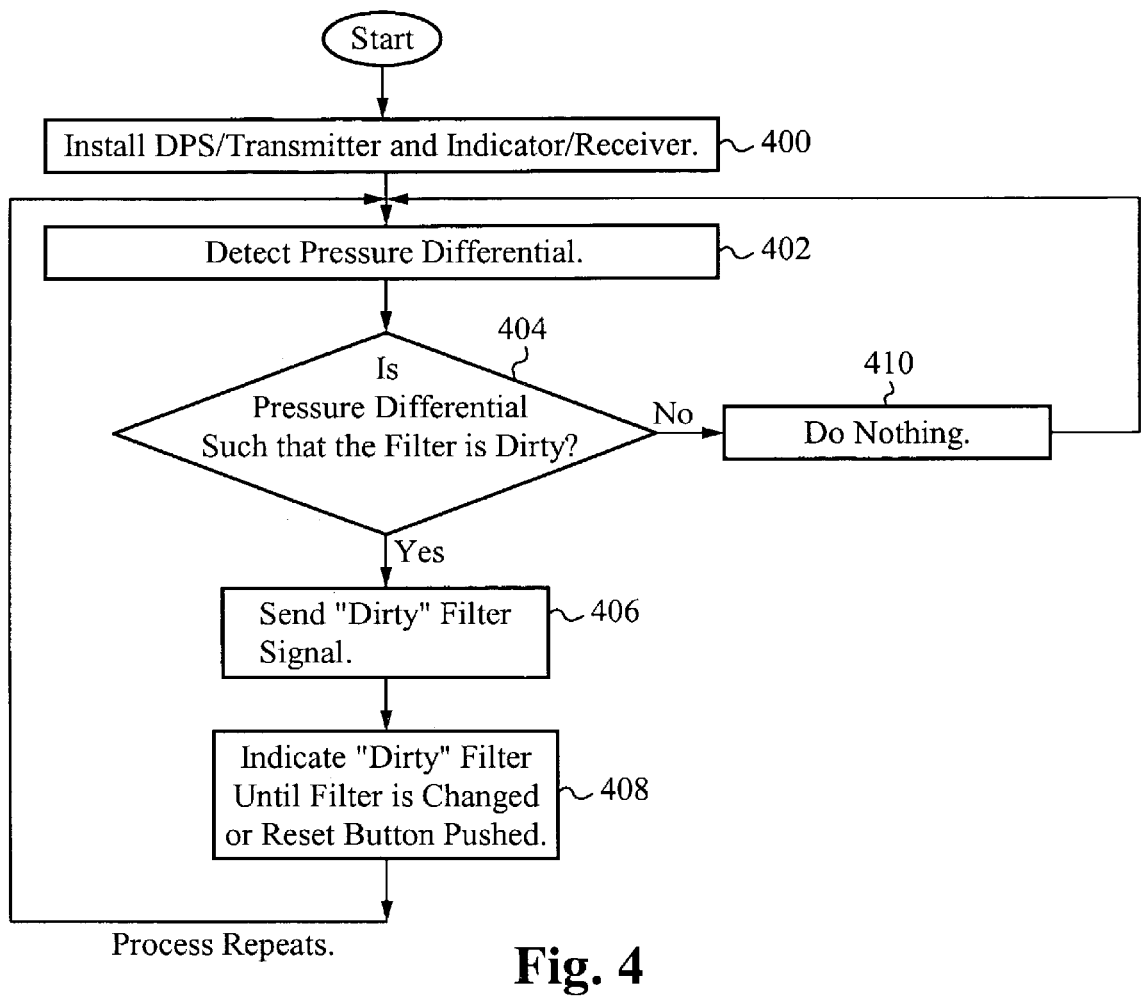
FIG. 4 illustrates a flow chart of the installation and operation of the preferred embodiment of the present invention.

FIG. 4 illustrates a flow chart of the installation and operation of the preferred embodiment of the present invention. In the step 400, the DPS/transmitter and the Indicator/Receiver are installed to function with the new or preexisting furnace and new thermostat. After installation, the DPS begins to detect the pressure differential in the step 402. In the step 404, the DPS determines if the pressure differential is such that the filter is dirty and needs to be replaced. If the pressure differential is not such that the filter is dirty, then nothing is done in the step 410 and the process resumes at the step 402, detecting pressure differential. If it is determined that the filter is dirty, then a "dirty" signal is sent to the receiver in the step 406. In the step 408, the receiver then indicates with the indicator that the filter is dirty and continues to indicate that the filter is dirty until the filter is replaced or the reset button is pushed. Once the filter is replaced or the reset button is pushed, the process resumes at the step 402 by detecting the differential pressure to determine if the filter needs to be replaced again. By operating in such a fashion, the DPS/transmitter/receiver and indicator are able to continuously monitor a furnace filter and indicate to a user the status of the filter at the thermostat.

To utilize the present invention a pressure activated switch or pressure indicating sensor, transmitter, receiver and indicator are installed onto a preexisting or new furnace and new thermostat system. The existing wires of the furnace and thermostat are used to allow for easier and less complicated installation. Furthermore, by using the preexisting wires, older systems are able to be upgraded to provide a powerful filter monitor without having to completely remodel the entire system. Once installation of the proper components is complete, the differential pressure switch monitors the pressure near the filter. When specified conditions are met, such as the pressure differential being a certain amount, the switch triggers circuitry in the transmitter which then sends the signal to the receiver which utilizes an indicator to indicate the filter is dirty.

Installation of the present invention onto a preexisting furnace/thermostat system is accomplished in a few steps. The pressure sensor switch is installed near the filter and is coupled to the transmitter. The transmitter couples to the thermostat wiring at the furnace coupling the furnace to the thermostat. The receiver with indicator comes pre-installed on/within the thermostat. Essentially the same coupling exists as for the original furnace/thermostat except with added components, the transmitter and receiver, in between the furnace and thermostat.

Figure 5:
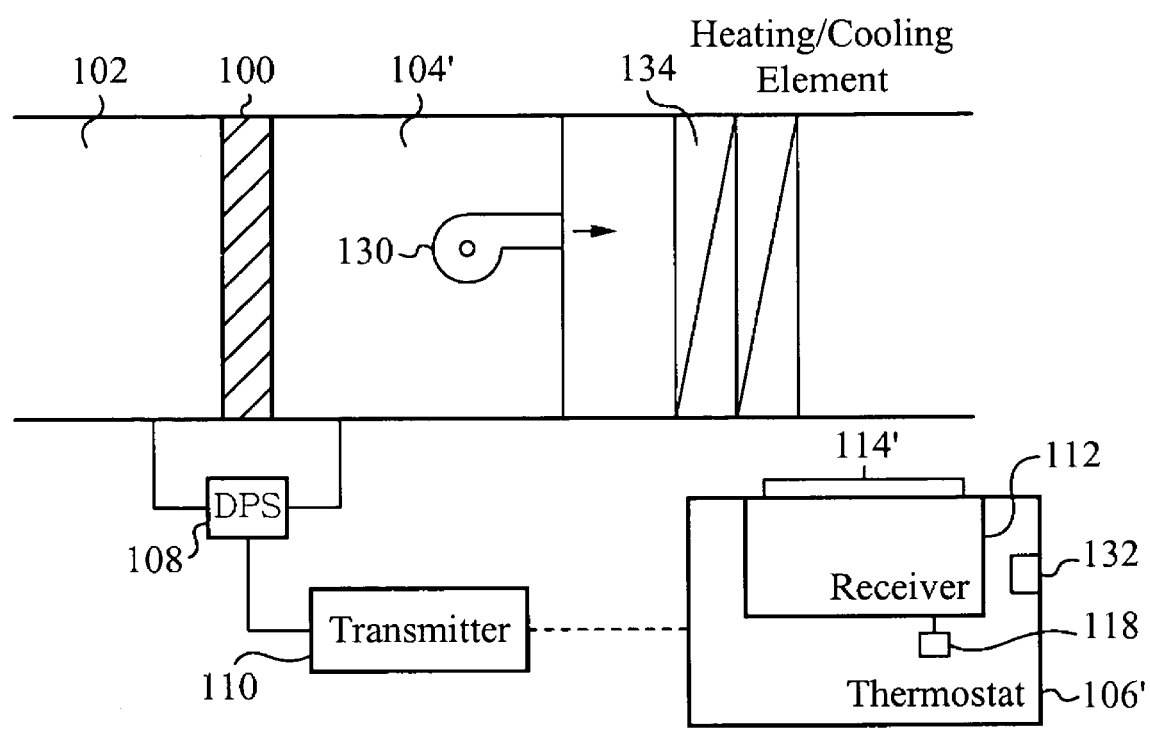
FIG. 5 illustrates a block diagram of a modified installation of a furnace and a thermostat in an alternative embodiment of the present invention.

FIG. 5 illustrates a block diagram of a modified installation of a furnace 104' and a thermostat 106' in an alternative embodiment of the present invention. Generally, this alternative embodiment is the same as the preferred embodiment except instead of determining the filter status based on the air pressure between the filter and the supply air fan, a pressure differential is taken on either side of the filter 100 using tubing or hoses to detect a pressure differential signaling the need to change the filter 100. The DPS high and low pressure sides reference static air pressure on either side of the filter upstream, downstream and/or a differential pressure sensor will replace the DPS and/or the transmitter will signal the receiver wirelessly. Based on the pressure difference around the filter 100, the DPS 108 determines if the filter 100 needs to be changed. Also shown in FIG. 5 is the battery 118 for powering the receiver 112 and a Liquid Crystal Display (LCD) indicator 114'. In some embodiments, an audible component 132 emits an audible signal instead of or in addition to the visual indicator 114'. Furthermore, a dashed line is shown indicating that the coupling between the transmitter 110 and receiver 112 is able to be wireless.

In some embodiments, the transmitter has an LED which is able to be flashing to indicate the status of the furnace filter. In an alternative embodiment, the reset switch and the latching logic is able to be located at the receiver/thermostat.

In some embodiments where a sensor is used, additional information is indicated. For example, in addition to "clean" and "dirty," the indicator indicates "slightly dirty" so that a user knows the filter will need to be replaced soon and is able to prepare by purchasing a replacement filter in advance.

In all embodiments, the DPS may be replaced by a sensor, yielding a variable "analog" signal which the transmitter/receiver circuitry may use to determine the status of the filter. When a DP Sensor is used, based on the pressure around the filter 100, the DP Sensor determines the status of the filter as shown in Table 2.

TABLE 2

| Transmitter/receiver circuitry logic. | |
|---|---|
| Differential Pressure Sensor Signal | Action |
| High (dirty filter) | Turn "replace" indicator ON |
| Medium (clean filter) (optional) | Turn "clean" indicator ON (optional) |
| Low | Indicator state does not change |

As shown in Table 2, when the pressure differential rises above a high threshold level, the "replace" or "dirty" indicator is turned ON to indicate the filter is dirty. In some embodiments, when the pressure differential is in a middle range, the "clean" indicator is turned ON to indicate the filter is clean. When the pressure differential falls below the low threshold level, the indicator state does not change. Thus if the indicator indicates "replace" already, it will remain on or if the indicator indicates "clean" that will remain on. In some embodiments, a user is able to designate the upper and lower threshold levels.

TABLE 3

| | Embodiments | |
|---|---|---|
| Pressure Device | Measuring Location | Signal Carrier |
| DP Switch | Fan Inlet/Room | Thermostat Wiring |
| DP Switch | Fan Inlet/Room | Wireless |
| DP Switch | Across Filter | Thermostat Wiring |
| DP Switch | Across Filter | Wireless |
| DP Sensor | Fan Inlet/Room | Thermostat Wiring |
| DP Sensor | Fan Inlet/Room | Wireless |
| DP Sensor | Across Filter | Thermostat Wiring |
| DP Sensor | Across Filter | Wireless |

Table 3 indicates some of the potential embodiments of the present invention beginning with the preferred embodiment and alternative embodiments following. The embodiments are configured by including either a Differential Pressure Switch or Sensor. The pressure differential is measured either near the fan inlet and the room or across the filter. Furthermore, the signal is either carried on the thermostat wiring or using a wireless system. Thus, the appropriate configuration is able to be utilized as needed.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for indicating a status of a forced air furnace filter comprising:
   a. a monitoring device for monitoring pressure differential;
   b. a transmitter device coupled to the monitoring device for transmitting a signal related to the pressure differential;
   c. a receiver device comprising one or more energy storing components, wherein the receiver device is coupled to the transmitter device for receiving the signal related to the pressure differential; and
   d. an indicator coupled to the receiver device for indicating status of the air filter based on the signal;
   wherein the transmitter device is housed separately from the receiver device, and wherein the receiver device is located at a thermostat.

2. The system as claimed in claim 1 wherein the transmitter device is coupled to a forced air furnace.

3. The system as claimed in claim 1 wherein the transmitter device is coupled to pre-existing wires coupling the furnace to the thermostat.

4. The system as claimed in claim 1 wherein the transmitter device and the receiver device are wirelessly coupled.

5. The system as claimed in claim 1 wherein the monitoring device is positioned to detect static air pressure near the filter and a room air pressure.

6. The system as claimed in claim 1 wherein the monitoring device is positioned to detect static air pressure on either side of the filter.

7. The system as claimed in claim 1 wherein the monitoring device is a differential pressure switch.

8. The system as claimed in claim 1 wherein the monitoring device is a differential pressure sensor.

9. The system as claimed in claim 1 wherein the indicator includes one or more light emitting diodes.

10. The system as claimed in claim 1 wherein the indicator is a liquid crystal display.

11. The system as claimed in claim 1 wherein the indicator indicates "dirty" after receiving a "dirty" signal from the transmitter device.

12. The system as claimed in claim 1 further comprising an audible indicator to audibly notify a user to change the filter.

13. The system as claimed in claim 3 wherein the transmitter device superimposes the signal on a carrier over the pre-existing wires.

14. The system as claimed in claim 13 wherein the carrier has a frequency of 175 KHz.

15. A system for indicating a status of a forced air furnace filter comprising:
   a. a pressure differential switch positioned near the forced air furnace filter for monitoring pressure differential;
   b. a transmitter device coupled to the pressure differential switch for transmitting a signal related to the pressure differential;
   c. a receiver device comprising one or more energy storing components, wherein the receiver device is coupled to the transmitter device for receiving the signal related to the pressure differential; and
   d. one or more light emitting diode indicators coupled to the receiver device for indicating status of the furnace filter based on the signal,
   wherein the transmitter device is coupled to pre-existing wires coupling a furnace to a thermostat, and further wherein the transmitter device is housed separately from the receiver device and wherein the receiver device is located at the thermostat.

16. The system as claimed in claim 15 wherein the one or more light emitting diode indicators indicate "dirty" after receiving a "dirty" signal from the transmitter device.

17. The system as claimed in claim 15 further comprising an audible indicator to audibly notify a user to change the filter.

18. A method of indicating a status of a forced air furnace filter comprising:
   a. detecting a pressure differential with a monitoring device;
   b. sending a signal from a transmitter device to a receiver device comprising one or more energy storing components, wherein the signal corresponds to the pressure differential;
   c. receiving the signal from the transmitter device at the receiver device; and
   d. indicating status of the forced air furnace filter on an indicator corresponding to the signal from the receiver device;
   wherein the transmitter device is housed separately from the receiver device, and wherein the receiver device is located at a thermostat.

19. The method as claimed in claim 18 further comprising installing the monitoring device and the transmitter device on a forced air furnace and installing the receiver device and the indicator on a thermostat.

20. The method as claimed in claim 19 wherein installing further comprises:
   a. positioning the monitoring device; and
   b. coupling the transmitter device to preexisting furnace wiring with the transmitter device coupled to the monitoring device, wherein the furnace is coupled to the thermostat.

21. The method as claimed in claim 18 wherein the transmitter device and the receiver device are wirelessly coupled.

22. The method as claimed in claim 20 wherein the monitoring device is positioned to detect static air pressure near the furnace filter and a room air pressure.

23. The method as claimed in claim 20 wherein the monitoring device is positioned to detect static air pressure on either side of the furnace filter.

24. The method as claimed in claim 18 wherein the monitoring device is a differential pressure switch.

25. The method as claimed in claim 18 wherein the monitoring device is a differential pressure sensor.

26. The method as claimed in claim 18 wherein the indicator includes one or more light emitting diodes.

27. The method as claimed in claim 18 wherein the indicator is a liquid crystal display.

28. The method as claimed in claim 18 wherein the indicator indicates "dirty" after receiving a "dirty" signal from the transmitter device.

29. The method as claimed in claim 18 wherein indicating the status is an audible signal.

30. The method as claimed in claim 20 wherein the transmitter device superimposes the signal on a carrier over the pre-existing wires.

31. The method as claimed in claim 30 wherein the carrier has a frequency of 175 KHz.

32. A method of installing a forced air furnace filter indicator comprising:
   a. positioning a monitoring device near the forced air furnace filter; and
   b. coupling a transmitter device to preexisting furnace wiring, wherein the transmitter device is also coupled to the monitoring device, and further wherein the forced air furnace is coupled to a housing containing a thermostat, a receiver and an indicator, wherein the receiver comprises one or more energy storing components;
wherein the transmitter device is housed separately from the thermostat.

33. The method as claimed in claim 32 wherein the monitoring device is a differential pressure switch.

34. The method as claimed in claim 32 wherein the monitoring device is a differential pressure sensor.

35. The method as claimed in claim 32 wherein the indicator includes one or more light emitting diodes.

36. The method as claimed in claim 32 wherein the indicator is a liquid crystal display.

37. The method as claimed in claim 32 wherein the indicator indicates "dirty" after receiving a "dirty" signal from the transmitter device.

38. A system for indicating a status of a forced air furnace filter comprising:
   a. a monitoring device for monitoring pressure differential;
   b. a transmitter having a transmitter housing, wherein the transmitter is coupled to the monitoring device for transmitting a signal related to the pressure differential;
   c. a receiver having a receiver housing and one or more energy storing components, wherein the receiver is coupled to the transmitter for receiving the signal related to the pressure differential; and
   d. an indicator coupled to the receiver for indicating status of the air filter based on the signal;
wherein the transmitter is housed separately from the receiver, and wherein the receiver is located at a thermostat.

39. The method as claimed in claim 18 wherein the signal is sent from the transmitter device to the receiver device when a pressure differential indicates a dirty filter.

\* \* \* \* \*